(No Model.) 5 Sheets—Sheet 1.

C. SEYBOLD & C. WHEALEN.
MACHINE FOR PASTING AND UNITING SHEETS OF STRAW BOARD.

No. 453,567. Patented June 2, 1891.

Attest.
C. W. Bozart,
R. B. Pillard.

Inventors.
Charles Whealen and
Charles Seybold
per Jno. W. Strehli
Atty.

(No Model.) 5 Sheets—Sheet 3.

C. SEYBOLD & C. WHEALEN.
MACHINE FOR PASTING AND UNITING SHEETS OF STRAW BOARD.

No. 453,567. Patented June 2, 1891.

Attest.
C. H. Bogart.

Inventors.
Charles Whealen and
Charles Seybold
per Jno. W. Strehli
Atty.

(No Model.) 5 Sheets—Sheet 4.

C. SEYBOLD & C. WHEALEN.
MACHINE FOR PASTING AND UNITING SHEETS OF STRAW BOARD.

No. 453,567. Patented June 2, 1891.

Attest.
C. W. Bogart.
R. B. Pulman

Inventors.
Charles Whealen and
Charles Seybold
per Jno. W. Strehli
Atty.

(No Model.) 5 Sheets—Sheet 5.
C. SEYBOLD & C. WHEALEN.
MACHINE FOR PASTING AND UNITING SHEETS OF STRAW BOARD.
No. 453,567. Patented June 2, 1891.
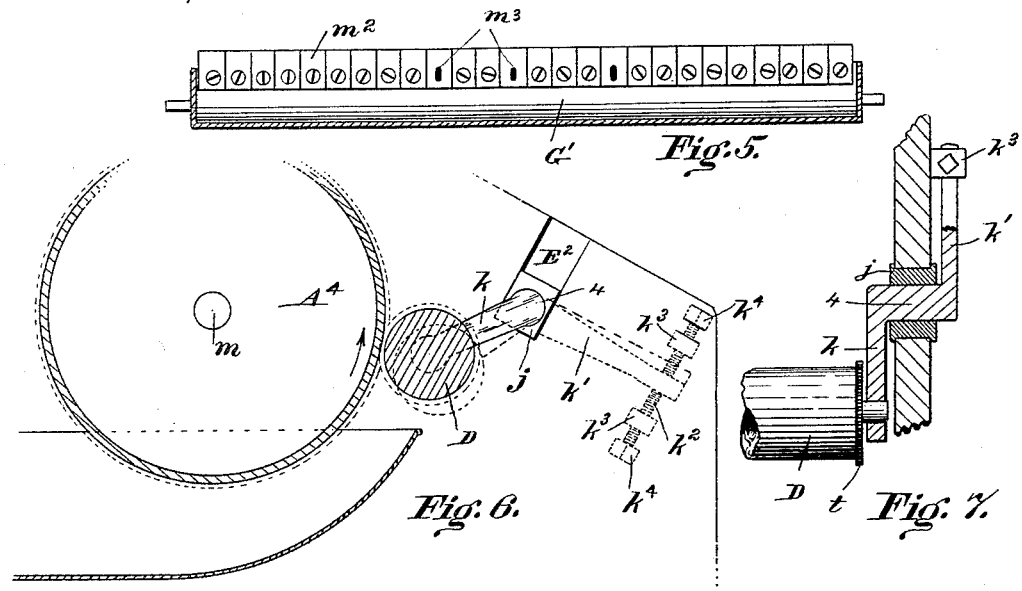
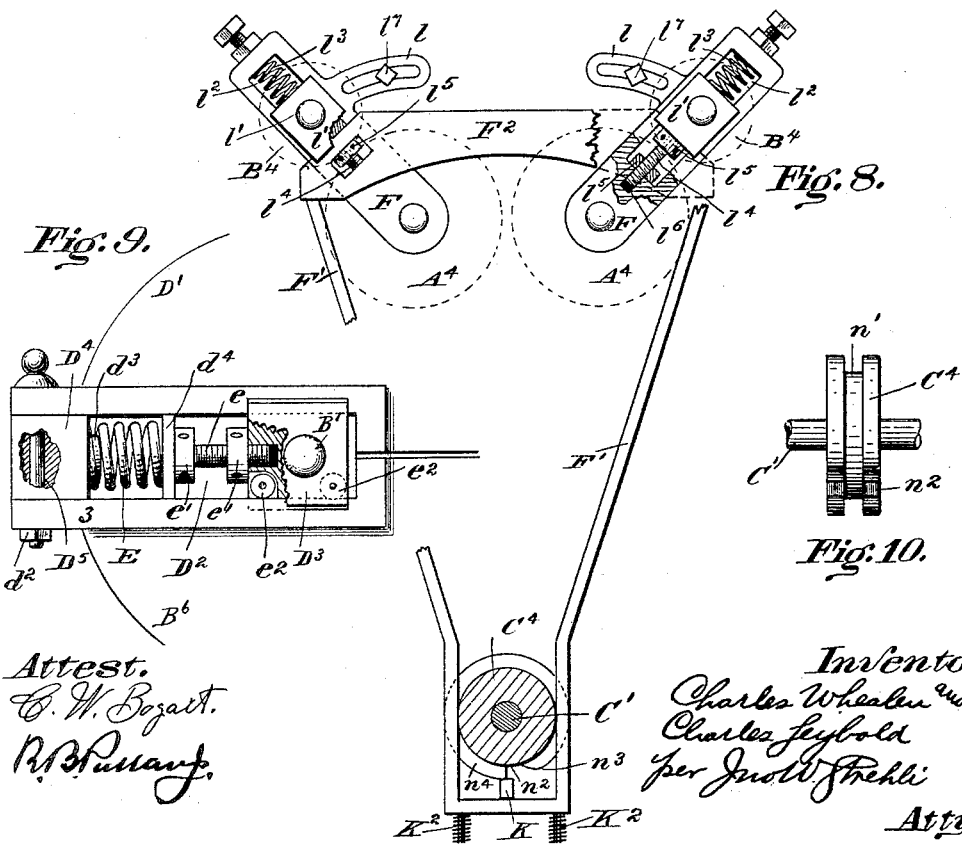

UNITED STATES PATENT OFFICE.

CHARLES SEYBOLD, OF CINCINNATI, AND CHARLES WHEALEN, OF DAYTON, ASSIGNORS TO THE C. L. HAWES COMPANY, OF DAYTON, OHIO.

MACHINE FOR PASTING AND UNITING SHEETS OF STRAW-BOARD.

SPECIFICATION forming part of Letters Patent No. 453,567, dated June 2, 1891.

Application filed July 5, 1887. Serial No. 243,458. (No model.)

*To all whom it may concern:*

Be it known that we, CHARLES SEYBOLD, residing at Cincinnati, in the county of Hamilton and State of Ohio, and CHARLES WHEALEN, residing at Dayton, in the county of Montgomery and State of Ohio, have invented certain new and useful Improvements in Machines for Pasting and Uniting Sheets of Straw-Board, of which the following is a specification.

This invention consists in the novel construction and combination of the parts hereinafter fully described and claimed.

Figure 1:
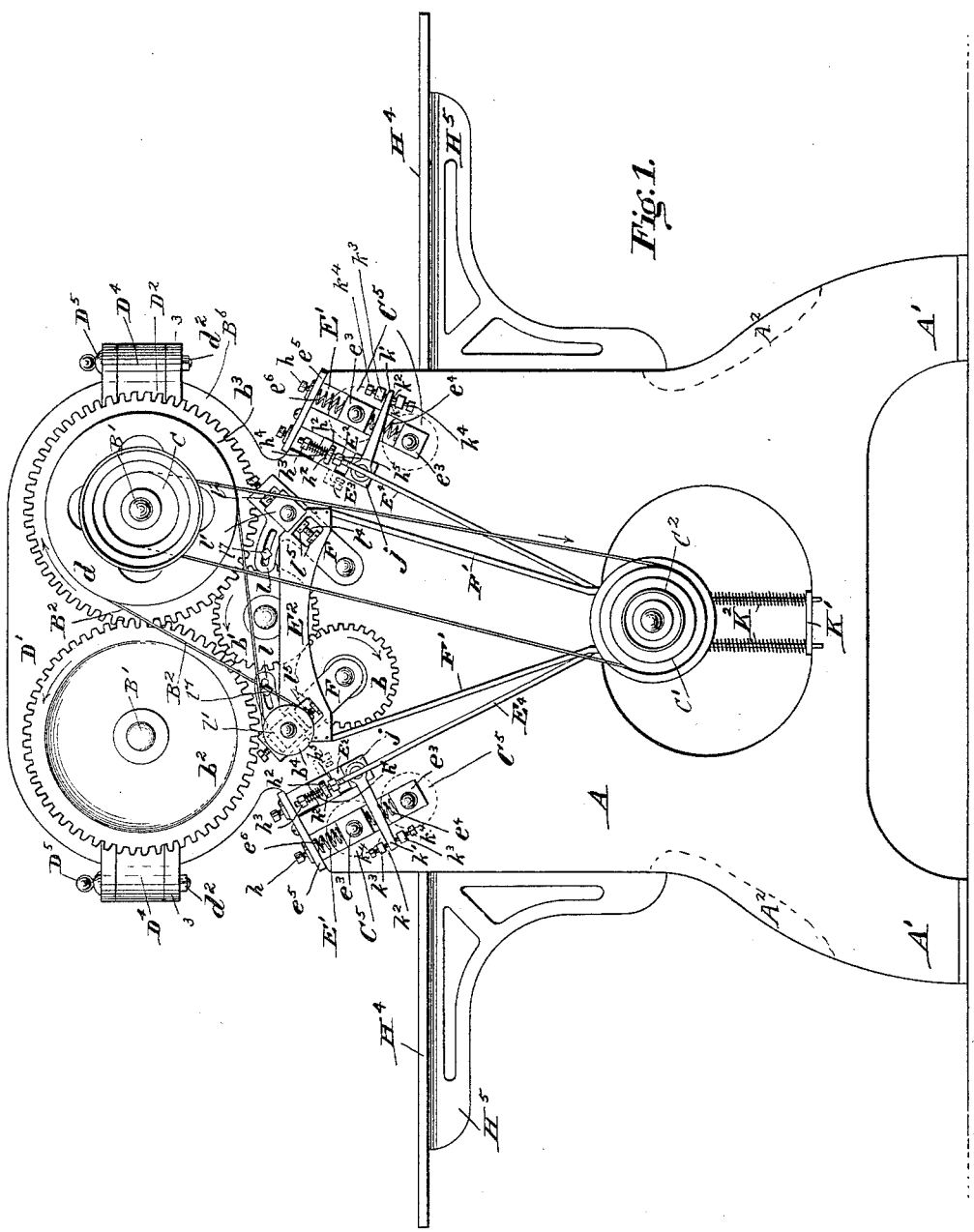
Figure 2:
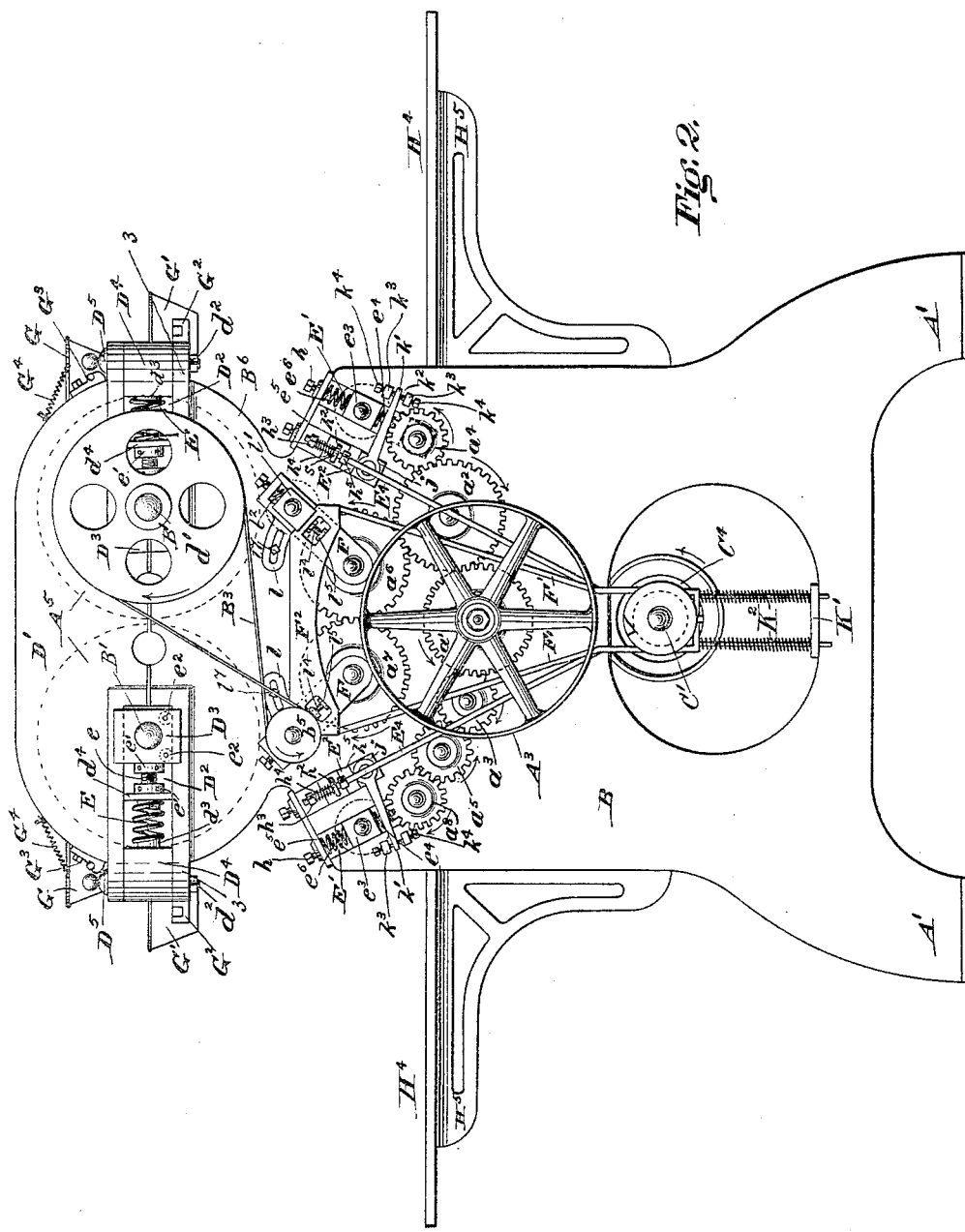
Figure 3:
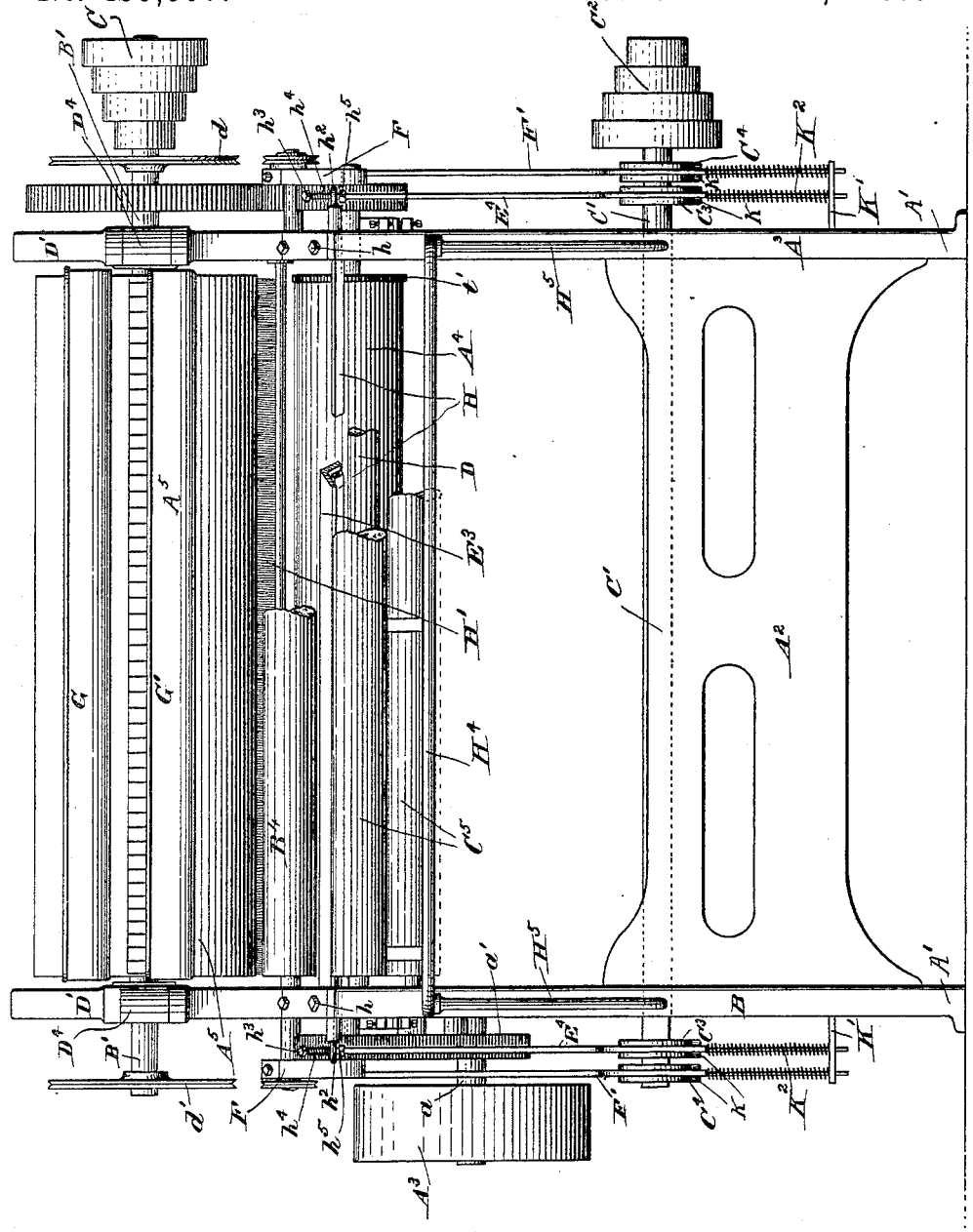
Figure 4:
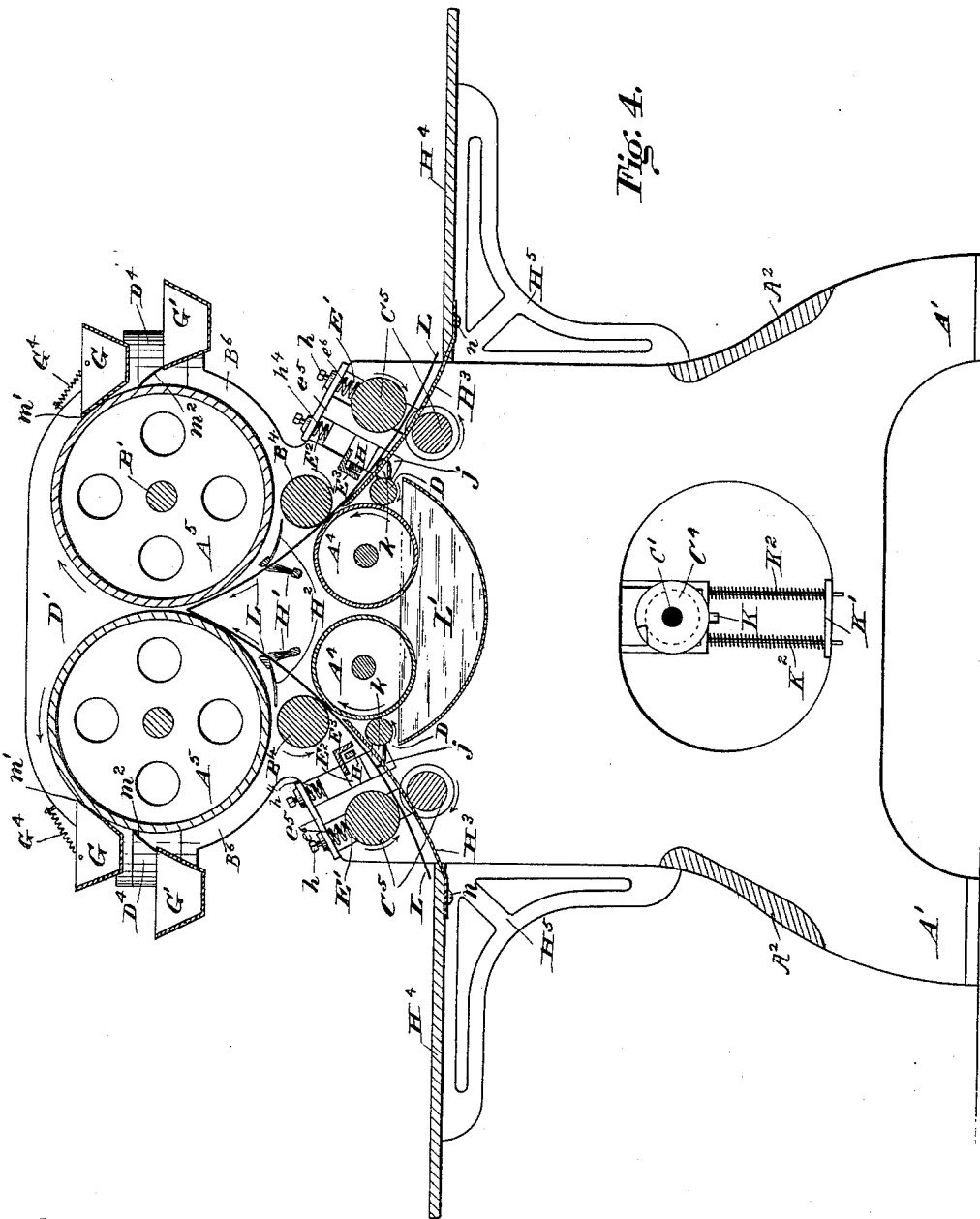

In the accompanying drawings, forming part of this specification, Figure 1 represents one side of the machine in elevation. Fig. 2 represents the other side of the machine in elevation. Fig. 3 is a front view of the machine, the feed-rolls, paste-rolls, paste pressure-roll, stationary bar, and movable guide-bar being broken away to show the paste-rolls, paste-brush, &c. Fig. 4 is a central vertical cross-section of the machine. Fig. 5 is a view of the lower surplus-paste hopper, showing the adjustable spring-fingers thereon. Fig. 6 is a sectional view of one of the paste-rolls, the paste-trough, and the paste-regulating roll, also showing the mechanism for adjusting the said paste-regulating rolls at any distance from the paste-rolls to regulate the amount of paste taken up by the paste-rolls. Fig. 7 is a sectional view of the arm and accompanying parts by which the paste-regulating rolls are held in position, the paste-regulating roll being shown with its spur-gear. Fig. 8 shows the cam, cam-rods, (the paste-rolls and paste pressure-rolls being in dotted lines,) and the mechanism by which the paste pressure-rolls can be regulated, and accompanying parts, through the agency of which the paste pressure-rolls are elevated and depressed on the straw-board sheets. Fig. 9 illustrates the mechanism by which the pressure-rolls are held in position, regulated, and adjusted. Fig. 10 is a detail view of one of the cams.

A represents one side frame of the machine, and B the other side frame. These side frames are castings of any suitable shape or contour, having legs A'. These side frame-castings are connected by the end castings $A^2$.

$H^4$ are two tables upon which the sheets to be united are laid. $C^5$ are revoluble feed-rolls. $A^4$ are pasting-rolls. $B^4$ are revoluble rolls for pressing the sheets onto the pasting-rolls when fed forward by the feeding-rolls, as shown in Fig. 4, in which L represents the sheets. $A^5$ are revoluble rolls for pressing together the pasted surfaces of the sheets. The detailed construction of all these parts and the means for operating them will be more fully described hereinafter.

$A^3$ is the driving-pulley, having secured upon its hub the gear-wheel $a'$, which imparts motion to the gear-wheels $a^2$ $a^3$, the gear-wheel $a^2$ imparting motion to the gear-wheel $a^4$, the gear-wheel $a^3$ imparting motion to the gear-wheel $a^5$, which imparts motion to gear-wheel $a^8$, the gear-wheel $a^2$ also imparting motion to the gear-wheel $a^6$, which imparts motion to the gear-wheel $a^7$, which latter gear-wheels $a^6$ and $a^7$ are secured to the shafts of the paste-rollers $A^4$ $A^4$. These paste-rolls extend from one side of the machine to the other (extending partly into the paste-trough L',) and one of the paste-rolls has the gear-wheel $b$ secured on its shaft, which gear-wheel imparts motion to the gear-wheel $b'$, which imparts motion to one of the intermeshing gears $b^2$ $b^3$, which gears $b^2$ $b^3$, being rigidly attached to the shafts which carry the pressure-rolls $A^5$ $A^5$, thereby impart motion to said pressure-rolls.

The shafts of the paste pressure-rolls $B^4$ extend across the machine and through the side frames A B. The shaft of one of said pressure-rolls $B^4$ carries the grooved pulley $b^5$, and the shaft of the other roll $B^4$ carries the grooved pulley $b^4$. The shafts B', which carry the pressure-rolls $A^5$, have the grooved pulleys $d$ and $d'$ secured on their ends. A cross-belt $B^2$ passes over the grooved pulleys $b^4$ and $d$ and a cross-belt $B^3$ passes over the grooved pulleys $b^5$ and $d'$, and thus motion is imparted to the paste pressure-rolls $B^4$.

One of the shafts B' which carry the pressure-rolls $A^5$ $A^5$ has the cone-shaped pulley C secured on it, and on the cam-shaft C' the cone-shaped pulley $C^2$ is secured. A belt passing over these pulleys C $C^2$ imparts motion to the cam-shaft C', and this shaft, carrying the cams $C^3$ $C^3$ and $C^4$ $C^4$, imparts motion to them. The gear-wheels $a^4$ $a^8$, attached to the journals of the feed-rolls $C^5$ $C^5$ impart motion to the said feed-rolls $C^5$ $C^5$.

D represents the paste-regulating rolls. D' represents head-pieces, formed as shown in Figs. 1 and 2. The tops $B^6$ of the side frame-castings A B are formed with flanges 3, as shown in Figs. 1 and 2. The head-pieces D' rest on these top parts $B^6$ of the castings A B at each side, forming between them the recesses $D^2$. (See Fig. 9.) In these recesses $D^2$ are placed the journal-boxes $D^3$, which carry the pressure-rolls $A^5$, and the bearing-blocks $D^4$. Pins $D^5$, secured at the bottom by nuts $d^2$, connect the head-pieces D' to the top parts $B^6$ of the side castings A B. Interposed between the lugs $d^3$ (which are cast on the back of the bearing-pieces $D^4$) and the bearing-strips $d^4$ are the springs E. Short screw-threaded rods $e$, (see Figs. 2 and 9,) which enter recesses in the journal-boxes $D^3$, carry the jam-nuts $e'$ $e'$. (See Figs. 2 and 9.) By turning these jam-nuts in the proper direction the journal-boxes $D^3$, carrying the pressure-rolls $A^5$, are either worked inward or outward in the recesses $D^2$ on the friction-rollers $e^2$, thus bringing the pressure-rolls $A^5$ closer together or farther apart from each other, thus making an adjustment for the thickness of the straw-board that is to pass between them.

The tension of the springs E ordinarily is kept constant for all thicknesses of straw-board, and the strips $d^4$ are not moved by turning the adjusting-nuts, but the said strips are free to slide in the recesses $D^2$ and the tension of the springs may be varied by turning the nuts more or less, as desired.

In the shoulders of each of the side frame-castings A B (on each side of the castings) are recesses E', in which recesses slide the journal-boxes $e^3$, (two journal-boxes being present in each recess E',) which carry the feed-rolls $C^5$. (See dotted lines, Fig. 1.) Interposed between the two boxes $e^3$ in each recess E' are the springs $e^4$, and between the upper box $e^3$ and the strip $e^5$, which is at the top of the recess E', are the springs $e^6$. Through the agency of the screws $h$ these boxes $e^3$ $e^3$, carrying the feed-rolls $C^5$ $C^5$, can be brought closer together or moved farther apart from each other. The ends of the screws $h$ are arranged to press upon the ends of the springs, and by turning the screws $h$ in the proper direction the springs $e^6$ in the recesses E' press upon the top journal-boxes $e^3$, moving them downward in the said recesses E', thus bringing the top journal-boxes $e^3$, and consequently the top feed-roll $C^5$, closer to the lower feed-roll. By turning the screws $h$ in the opposite direction said top boxes $e^3$ are elevated by the springs $e^4$, thus bringing the top feed-roll farther away from the lower feed-roll, thus making the feed-rolls $C^5$ adjustable to adapt them to feed sheets of straw-board of various thicknesses.

Above the recesses E' in the frame-castings A B on each side of the machine are the recesses $E^2$. To the sliding blocks $s$ at each side of the machine are secured the angular bars $E^3$. Preferably the bars $E^3$ are rigidly attached to said sliding blocks $s$. These sliding blocks $s$ work up and down in said recesses $E^2$, and the cam-rods $E^4$ are connected to said blocks $s$. Consequently when the cam-rods $E^4$ are in motion they carry these blocks $s$ up and down in said recesses $E^2$, and the bars $E^3$ being rigidly connected to said blocks $s$ the said bars move up and down with said blocks. Through the eyes $h^2$ (which eyes are rigidly connected to the sliding blocks $s$) pass the ends of the cam-rods $E^4$. Interposed between these eyes $h^2$ and nuts $h^3$ on the ends of the cam-rods $E^4$ are the springs $h^4$, and below the eyes $h^2$ on said cam-rods $E^4$ are the nuts $h^5$. These nuts on the cam-rods $E^4$ can be turned so as to raise or lower the sliding boxes $s$, thus raising and lowering the angular gage-bars $E^3$, thus making said gage-bars adjustable. When the cam-rods $E^4$ work up and down by reason of the finger K traveling either the raised or the drop surface of the cams $C^3$, the angular gage-bars $E^3$ are worked up and down, bringing said bars on and off the sheets that have just been fed into the machine. The object of these gage-bars $E^3$ is to hold the sheets being fed to the machine until the sheets fed before them have passed such a point on their journey through the machine that these sheets which are being held by the gage-bars $E^3$ will not conflict with or overtake the sheets fed before them. The sheets are carried into the machine by the feed-rolls and are stopped simultaneously by the gage-bars, ready to be received by the pasting mechanism to which the sheets are next fed simultaneously, when they are released by the gage-bars $E^3$, thus avoiding confusion, making it possible to have a sheet always ready for the pasting mechanism, thus causing no loss of time and gaging the time when the last sheets fed should be released to finish their journey through the machine. In these same recesses $E^2$ (just above described) are the blocks $j$. The arms $k$ (see Figs. 4 and 6) are connected at one end to the pins 4, which are journaled in the blocks $j$. The paste-regulating rolls D have their spindles journaled in the free ends of said arms $k$. Adjusting-arms $k'$ are secured to the other ends of the pins 4.

The letter $k^2$ represents two adjustment-screws. (See more particularly Figs. 6 and 7.) These screws impinge against the adjustment-arms $k'$, and turning the said screws (which are supported by and pass through the lugs $k^3$) in the proper direction by their heads $k^4$ raises or lowers the said adjustment-arms $k'$, and through them and the arms $k$ the paste-regulating rolls D, (which rolls are supported by said arms $k$,) thus making the paste-regulating rolls D adjustable and allowing more or less paste to be fed to the paste-rolls $A^4$. This adjustment mechanism is shown in detail in Figs. 6 and 7, and the dotted lines show the position the parts may be made to assume.

F represents removable adjustable journal-bearing pieces for the paste pressure-rollers B⁴, (on each side of the machine,) having the slotted arms *l*. These journal-bearing pieces F are pivoted on the extended journals of the paste-rolls A⁴ and are held in position in any suitable manner. The preferred way is as follows: Through the slotted arms *l* pass set-screws *l'*, through the agency of which and the arms *l* the journal-bearing pieces F can be adjusted to bring the paste pressure-rolls B⁴ in the proper plane or angle to the paste-rolls A⁴.

The paste pressure-rolls B⁴ are journaled in boxes *l'*, which work in the slots *l²*. (See Fig. 8.) Between the journal-boxes *l'* and the top of the journal-bearing pieces F are interposed the springs *l³*. (See Fig. 8.) Short screw-threaded rods *l⁴*, carrying two jam-nuts *l⁵*, are interposed between the journal-boxes *l'* and the bottom part of the journal-bearing pieces F. (See particularly Fig. 8.) These rods *l⁴* also enter recesses *l⁶* in the bottom part of the journal-bearing pieces F. (See Fig. 8.) By screwing the jam-nuts *l⁵* in the proper direction the journal-boxes *l'*, carrying the paste pressure-rolls B⁴, are either brought downward in the slots *l²*, bringing the rolls B⁴ closer to the paste-rolls A⁴, or moved upward in the said slots *l²* and bringing the rolls B⁴ farther away from the paste-rolls A⁴, thus regulating the amount of pressure required against the paste-rolls and regulating the distance between the paste-rolls A⁴ and the paste pressure-rolls B⁴ to accommodate sheets of straw-board of varying thicknesses.

F' represents cam-rods, which rods are united at the top by yokes F², connected to the cam-rods F' in any suitable manner. These yokes F² pass over the outside of the journal-bearing pieces F and into suitable recesses in the journal-boxes *l'*, so that the boxes *l'* practically rest on said yokes F², so that when the cam-rods F' and the yokes F² are elevated the journal-boxes *l'*, carrying the paste pressure-rolls B⁴, are also elevated, and when the said rods and yoke drop, the rolls B⁴ also fall back into their original position, the springs *l³* assisting.

The mechanism just described is illustrated in detail in Fig. 8. The rolls D have the spur-gear *t*, (see Fig. 7,) the paste-rolls A⁴ also having the spur-gear *t'*. (See Fig. 3.) This spur-gear *t'* meshes with the spur-gear *t* on the rolls D, and thus motion is imparted to the said paste-regulating rollers D.

G and G' represent the surplus-paste hoppers, G representing the upper hoppers and G' the lower hoppers, the lower hoppers G' resting in the brackets G², (see Fig. 2,) and the upper hoppers G resting in the brackets G³. The upper hoppers G are also supported and held in position by the springs G⁴. (See Fig. 2.) These hoppers are removable. The upper hoppers G have each a rigid lip *m'*, (see Fig. 4,) and the lower hoppers G' a series of flexible fingers *m²*. (See Fig. 5.) These fingers *m²* are preferably provided with the slots *m³*, in order to make them adjustable, so that their ends will all be in the same plane. These hoppers G and G' receive all the paste which is scraped off the pressure-rolls A⁵ by the lips *m'* removing the greater part, and fingers *m²* acting as followers to scrape off all that remains. The paste that is thus scraped off the pressure-rolls A⁵ is the paste which is squeezed out from between the two sheets of straw-board while said sheets are passing between said pressure-rolls to be united.

H represent stationary bars, over which the angular gage-bars E³ fit and work. These bars H extend entirely across the machine, being rigidly fastened in each side. These bars H, which keep the sheets from buckling and keep them in their proper path, and angular gage-bars E³, are shown in dotted lines in Fig. 1. The brushes H' (see Figs. 3 and 4) extend entirely across the machine. The purpose of these brushes is to assist in spreading the paste evenly over the straw-board sheets passing through the machine and to sweep off the surplus paste.

The fingers H² are placed at intervals across the machine and assist in keeping the straw-board sheets in their proper paths. (See Fig. 4.)

The letters H³ represent guide-strips placed at intervals across the machine to guide the straw-board sheets in as far as the paste-rolls A⁴. These strips H³ are fastened at *n* (see Fig. 4) to the under side of the tables H⁴ and pass between the feed-rolls C⁵ in over the paste-regulating rolls D and up to the paste-rolls A⁴. (See Fig. 4.) The lower feed-rolls C⁵, where these gage-strips H³ pass over them, are cut away to allow said guide-strips to pass. A table H⁴ is provided at each end of the machine, and is supported by the brackets H⁵. The straw-board sheets rest on these tables and are fed into the machine therefrom. The cams C³ and C⁴ each contain the grooves *n'*, (see Fig. 10,) and have each the drop-surface *n²*, incline *n³*, and raised portion *n⁴*. (See Figs. 8 and 10.) The cam-rods E⁴ and F' are shaped as shown, and at their lower ends, which slide in the grooves *n'*, form a U-shaped portion provided with the fingers K, which fingers travel the faces of the cams. The fingers K are wider than the cam-rods and extend across the face of the cams, so that the rods may be actuated by the cams.

Between strips K' and the bottom of the U-shaped portion of the cam-rods are placed the springs K². These springs assist in throwing the fingers K into the drop-surface of the cams. When the finger K on the cam-rods F' is traveling the raised surface of the cam C⁴, the paste pressure-rollers B⁴ are depressed and in contact with the straw-board sheet, and when traveling the drop-surface *n²* the rolls are elevated. When depressed, the said rolls B⁴ press the sheets on the paste-rollers A⁴, and when up allow the next sheet to enter between them and said paste-rolls. When the finger K on the rods E⁴ is traveling the raised surface of the cams C⁵, the angular gage-bar E³ is depressed on the sheets, and when traveling the drop-surface $n^2$, the said bar E³ is elevated, allowing the sheets to pass inward ready for the paste-rolls and paste pressure-rolls. The cam-rods E⁴ come down first, and are followed by the cam-rods F' the cam-rods E⁴ by their movements forcing the gage-bar E³ to impinge against the sheets and hold said sheets ready to deliver them to the paste-rolls and paste pressure-rolls, which are operated by said cam-rods F'. The cam-rods E⁴ come down first and are followed by the cam-rods F', the cam-rods E⁴ by their movements allowing the guide-bar E³ to impinge the sheets, holding the sheets ready to deliver them to the paste pressure-rolls, which said paste pressure-rolls are moved up and down by said cam-rods F'. The cam-rods E⁴, as they operate the gage-bar E³, must necessarily come down first to hold the seat ready to deliver it to the paste-rolls and paste pressure-rolls.

The object of having the gage-bar E³, which is operated by the cam-rods E⁴, is to guide the sheets—mainly, however, to make it possible for the operator to feed in the sheets quickly, the gage-bar E³ of course holding the sheets in readiness to deliver them when the sheets previously fed have passed between the paste-rolls and paste pressure-rolls—that is, when the paste pressure-rolls are elevated by the cam-rods F'.

What we claim as new and of our invention, and desire to secure by Letters Patent, is—

1. In a machine for pasting and uniting sheets of straw-board, the combination, with the feed-rolls, pasting-rolls, paste-regulating rolls, and pressure-rolls, of stationary bar H, gage-bars E³, and mechanism adapted to raise and lower said gage-bars E³, substantially as set forth.

2. In a machine for pasting and uniting sheets of straw-board, to which two sheets are fed simultaneously, the combination of two sets of feed-rolls, paste-regulating rolls, paste pressure-rolls, paste-rolls, and pressure-rolls A⁵, gage-bars E³, brushes H', and connecting mechanism, substantially as set forth.

3. The combination, with the paste-rolls A⁴, of adjustable paste-regulating rolls D, and the supporting-arms $k\ k'$, journaled in the side frames of the machine, substantially as set forth.

4. In a machine for pasting and uniting sheets of straw-board, the combination of pressure-rolls and surplus-paste hoppers, and connecting and operating mechanism, substantially as set forth.

5. In a machine for pasting and uniting sheets of straw-board, the combination of paste-rolls A⁴, adjustable paste pressure-rolls B⁴, and rods F', yoke F², journal-bearing pieces F, in which said paste pressure-rolls are journaled, cams C⁴, and connecting mechanism, substantially as set forth.

6. In a machine for pasting and uniting sheets of straw-board, the combination of paste-rolls A⁴, the boxes l', paste pressure-rolls B⁴, journaled in boxes l', the bearing-pieces F, springs $l^3$ in journal-bearing pieces F, cams C⁴, cam-rods F', and yokes F², substantially as set forth.

7. In a machine for pasting and uniting sheets of straw-board, the combination of paste-rolls A⁴, adjustable paste-regulating rolls D, box j, arms $k\ k'$, and set-screws $k^2$, substantially as set forth.

8. In a machine for pasting and uniting sheets of straw-board, the combination of head-pieces D', the top castings B⁶, pressure-rolls A⁵, boxes D³, bearing-blocks D⁴, springs E, jam-nuts e', and screw-rod e, substantially as set forth.

9. In a machine for pasting and uniting sheets of straw-board, the pressure-rolls A⁵, in combination with hoppers G, having rigid lips m', and hoppers G', having adjustable fingers $m^2$, substantially as set forth.

10. In a machine for pasting and uniting sheets of straw-board, the paste-hoppers G, having spring-fingers $m^2$, substantially as set forth.

11. In a machine for pasting and uniting sheets of straw-board, the combination, with the feed-rolls and the paste-rolls, of the paste pressure-rolls B⁴, cam-rods F', angular gage-bar E³, cam-rods E⁴, cams C³ C⁴, and connecting and operating mechanism, substantially as set forth.

12. In a machine for pasting and uniting sheets of straw-board, gage-strips H³, stationary bars H, gage-bars E³, and guide-fingers H², in combination with feed-rolls, paste-rolls, and pressure-rolls, substantially as set forth.

13. In a machine for pasting and uniting sheets of straw-board, the combination of the paste pressure-rolls B⁴, the angular gage-bar, E³, and mechanism for automatically raising and lowering said roller and gage-bar, substantially as set forth.

14. In a machine for pasting and uniting sheets of straw-board, the combination of feed-rolls, guide-strips H³, paste-rolls, paste-regulating rolls, gage-bars E³, brushes H', fingers H², and uniting-rolls, substantially as set forth.

15. In a machine for pasting and uniting sheets of straw-board, the combination of feed-rolls, paste-rolls, paste-regulating rolls, pressure-rolls, uniting-rolls, with brushes H' placed immediately above the paste-rolls, substantially as set forth.

CHARLES SEYBOLD.
CHARLES WHEALEN.

Witnesses as to Chas. Seybold:
J. M. EDWARDS,
E. H. FOSTER.

Witnesses as to Charles Whealen:
C. S. LEWIS,
C. L. BAIRD.